(12) United States Patent
Albu et al.

(10) Patent No.: US 9,160,897 B2
(45) Date of Patent: Oct. 13, 2015

(54) FAST MOTION ESTIMATION METHOD

(75) Inventors: Felix Albu, Bucharest (RO); Corneliu Florea, Bucharest (RO); Adrian Zamfir, Bucharest (RO); Alexandru Drimbarean, Galway (IE); Peter Corcoran, Galway (IE)

(73) Assignee: FotoNation Limited, Ballybrit, Galway (IE)

( * ) Notice: Subject to any disclaimer, the term of this patent is extended or adjusted under 35 U.S.C. 154(b) by 2085 days.

(21) Appl. No.: 12/137,113

(22) Filed: Jun. 11, 2008

(65) Prior Publication Data

US 2008/0309769 A1 Dec. 18, 2008

Related U.S. Application Data

(60) Provisional application No. 60/944,046, filed on Jun. 14, 2007.

(51) Int. Cl.
*H04N 5/228* (2006.01)
*H04N 5/14* (2006.01)
(Continued)

(52) U.S. Cl.
CPC ........... *H04N 5/144* (2013.01); *H04N 5/23248* (2013.01); *H04N 5/23261* (2013.01); *H04N 19/527* (2014.11)

(58) Field of Classification Search
CPC .............. H04N 5/144; H04N 5/23261; H04N 5/23248; H04N 19/527
USPC ........................................... 348/208.1, 208.3
See application file for complete search history.

(56) References Cited

U.S. PATENT DOCUMENTS 5,251,019 A 10/1993 Moorman et al.
5,374,956 A 12/1994 D'Luna
(Continued)

FOREIGN PATENT DOCUMENTS

DE 3729324 A1 3/1989
DE 10154203 A1 6/2002
(Continued)

OTHER PUBLICATIONS

John R. Deller, Jr., John H. L. Hansen, and John G. Proakis, Discrete-Time Processing of Speech Signals, IEEE Press Classic Reissue (Hardcover), Mar. 1993, 908 pages, A John Wiley & Sons, Inc., Publication, ISBN: 0-7803-5386-2.
Andrews, H.C. et al., "Digital Image Restoration", Prentice Hall, 1977.
Zitova, Barabara et al., "Image registration methods: a survey," Image and Vision Computing, 2003, pp. 977-1000, vol. 21.
(Continued)

*Primary Examiner* — Antoinette Spinks
(74) *Attorney, Agent, or Firm* — Hickman Palermo Becker Bingham LLP

(57) ABSTRACT

An estimated total camera motion between temporally proximate image frames is computed. A desired component of the estimated total camera motion is determined including distinguishing an undesired component of the estimated total camera motion, and including characterizing vector values of motion between the image frames. A counter is incremented for each pixel group having a summed luminance that is greater than a threshold. A counter may be decremented for pixels that are under a second threshold, or a zero bit may be applied to pixels below a single threshold. The threshold or thresholds is/are determined based on a dynamic luminance range of the sequence. The desired camera motion is computed including representing the vector values based on final values of counts for the image frames. A corrected image sequence is generated including the desired component of the estimated total camera motion, and excluding the undesired component.

27 Claims, 5 Drawing Sheets

(51) Int. Cl.
*H04N 5/232* (2006.01)
*H04N 19/527* (2014.01)

(56) References Cited

U.S. PATENT DOCUMENTS

| | | | |
|---|---|---|---|
| 5,392,088 | A | 2/1995 | Abe et al. |
| 5,428,723 | A | 6/1995 | Ainscow et al. |
| 5,510,215 | A | 4/1996 | Prince et al. |
| 5,599,766 | A | 2/1997 | Boroson et al. |
| 5,686,383 | A | 11/1997 | Long et al. |
| 5,747,199 | A | 5/1998 | Roberts et al. |
| 5,751,836 | A | 5/1998 | Wildes et al. |
| 5,756,239 | A | 5/1998 | Wake |
| 5,756,240 | A | 5/1998 | Roberts et al. |
| 5,802,220 | A | 9/1998 | Black et al. |
| 5,889,277 | A | 3/1999 | Hawkins et al. |
| 5,889,554 | A | 3/1999 | Mutze |
| 5,909,242 | A | 6/1999 | Kobayashi et al. |
| 5,981,112 | A | 11/1999 | Roberts |
| 6,028,960 | A | 2/2000 | Graf et al. |
| 6,035,072 | A | 3/2000 | Read |
| 6,041,078 | A * | 3/2000 | Rao .................... 375/240.16 |
| 6,061,462 | A | 5/2000 | Tostevin et al. |
| 6,081,606 | A | 6/2000 | Hansen et al. |
| 6,114,075 | A | 9/2000 | Long et al. |
| 6,122,017 | A * | 9/2000 | Taubman .................. 348/620 |
| 6,124,864 | A | 9/2000 | Madden et al. |
| 6,134,339 | A | 10/2000 | Luo |
| 6,269,175 | B1 | 7/2001 | Hanna et al. |
| 6,297,071 | B1 | 10/2001 | Wake |
| 6,297,846 | B1 | 10/2001 | Edanami |
| 6,326,108 | B2 | 12/2001 | Simons |
| 6,330,029 | B1 | 12/2001 | Hamilton et al. |
| 6,360,003 | B1 | 3/2002 | Doi et al. |
| 6,365,304 | B2 | 4/2002 | Simons |
| 6,381,279 | B1 * | 4/2002 | Taubman ................. 375/240.18 |
| 6,387,577 | B2 | 5/2002 | Simons |
| 6,407,777 | B1 | 6/2002 | DeLuca |
| 6,535,244 | B1 | 3/2003 | Lee et al. |
| 6,555,278 | B1 | 4/2003 | Loveridge et al. |
| 6,567,536 | B2 | 5/2003 | McNitt et al. |
| 6,599,668 | B2 | 7/2003 | Chari et al. |
| 6,602,656 | B1 | 8/2003 | Shore et al. |
| 6,607,873 | B2 | 8/2003 | Chari et al. |
| 6,618,491 | B1 | 9/2003 | Abe |
| 6,625,396 | B2 | 9/2003 | Sato |
| 6,643,387 | B1 | 11/2003 | Sethuraman et al. |
| 6,741,960 | B2 | 5/2004 | Kim et al. |
| 6,863,368 | B2 | 3/2005 | Sadasivan et al. |
| 6,892,029 | B2 | 5/2005 | Tsuchida et al. |
| 6,947,609 | B2 | 9/2005 | Seeger et al. |
| 6,961,518 | B2 | 11/2005 | Suzuki |
| 7,019,331 | B2 | 3/2006 | Winters et al. |
| 7,072,525 | B1 | 7/2006 | Covell |
| 7,084,037 | B2 | 8/2006 | Gamo et al. |
| 7,160,573 | B2 | 1/2007 | Sadasivan et al. |
| 7,177,538 | B2 | 2/2007 | Sato et al. |
| 7,180,238 | B2 | 2/2007 | Winters |
| 7,195,848 | B2 | 3/2007 | Roberts |
| 7,269,292 | B2 | 9/2007 | Steinberg |
| 7,292,270 | B2 | 11/2007 | Higurashi et al. |
| 7,315,324 | B2 | 1/2008 | Cleveland et al. |
| 7,315,630 | B2 | 1/2008 | Steinberg et al. |
| 7,315,631 | B1 | 1/2008 | Corcoran et al. |
| 7,316,630 | B2 | 1/2008 | Tsukada et al. |
| 7,316,631 | B2 | 1/2008 | Tsunekawa |
| 7,317,815 | B2 | 1/2008 | Steinberg et al. |
| 7,336,821 | B2 | 2/2008 | Ciuc et al. |
| 7,369,712 | B2 | 5/2008 | Steinberg et al. |
| 7,403,643 | B2 | 7/2008 | Ianculescu et al. |
| 7,453,493 | B2 | 11/2008 | Pilu |
| 7,453,510 | B2 | 11/2008 | Kolehmainen et al. |
| 7,460,695 | B2 | 12/2008 | Steinberg et al. |
| 7,469,071 | B2 | 12/2008 | Drimbarean et al. |
| 7,489,341 | B2 | 2/2009 | Yang et al. |
| 7,548,256 | B2 | 6/2009 | Pilu |
| 7,551,755 | B1 | 6/2009 | Steinberg et al. |
| 7,565,030 | B2 | 7/2009 | Steinberg et al. |
| 7,593,144 | B2 | 9/2009 | Dymetman |
| 7,623,153 | B2 | 11/2009 | Hatanaka |
| 2001/0036307 | A1 | 11/2001 | Hanna et al. |
| 2002/0006163 | A1 | 1/2002 | Hibi et al. |
| 2003/0052991 | A1 | 3/2003 | Stavely et al. |
| 2003/0058361 | A1 | 3/2003 | Yang |
| 2003/0091225 | A1 | 5/2003 | Chen |
| 2003/0103076 | A1 | 6/2003 | Neuman |
| 2003/0151674 | A1 | 8/2003 | Lin |
| 2003/0152271 | A1 | 8/2003 | Tsujino et al. |
| 2003/0169818 | A1 | 9/2003 | Obrador |
| 2003/0193699 | A1 | 10/2003 | Tay |
| 2003/0219172 | A1 | 11/2003 | Caviedes et al. |
| 2004/0066981 | A1 | 4/2004 | Li et al. |
| 2004/0076335 | A1 | 4/2004 | Kim |
| 2004/0090532 | A1 | 5/2004 | Imada |
| 2004/0120598 | A1 | 6/2004 | Feng |
| 2004/0120698 | A1 | 6/2004 | Hunter |
| 2004/0130628 | A1 | 7/2004 | Stavely |
| 2004/0145659 | A1 | 7/2004 | Someya et al. |
| 2004/0169767 | A1 | 9/2004 | Norita et al. |
| 2004/0212699 | A1 | 10/2004 | Molgaard |
| 2004/0218057 | A1 | 11/2004 | Yost et al. |
| 2004/0218067 | A1 | 11/2004 | Chen et al. |
| 2004/0247179 | A1 | 12/2004 | Miwa et al. |
| 2005/0010108 | A1 | 1/2005 | Rahn et al. |
| 2005/0019000 | A1 | 1/2005 | Lim et al. |
| 2005/0031224 | A1 | 2/2005 | Prilutsky et al. |
| 2005/0041121 | A1 | 2/2005 | Steinberg et al. |
| 2005/0041123 | A1 | 2/2005 | Ansari et al. |
| 2005/0047672 | A1 | 3/2005 | Ben-Ezra et al. |
| 2005/0052553 | A1 | 3/2005 | Kido et al. |
| 2005/0057687 | A1 | 3/2005 | Irani et al. |
| 2005/0068452 | A1 | 3/2005 | Steinberg et al. |
| 2005/0140801 | A1 | 6/2005 | Prilutsky et al. |
| 2005/0140829 | A1 * | 6/2005 | Uchida et al. .................. 348/625 |
| 2005/0201637 | A1 | 9/2005 | Schuler et al. |
| 2005/0219391 | A1 | 10/2005 | Sun et al. |
| 2005/0231625 | A1 | 10/2005 | Parulski et al. |
| 2005/0248660 | A1 | 11/2005 | Stavely et al. |
| 2005/0259864 | A1 | 11/2005 | Dickinson et al. |
| 2005/0270381 | A1 | 12/2005 | Owens et al. |
| 2005/0281477 | A1 | 12/2005 | Shiraki et al. |
| 2006/0006309 | A1 | 1/2006 | Dimsdale et al. |
| 2006/0017837 | A1 | 1/2006 | Sorek et al. |
| 2006/0038891 | A1 | 2/2006 | Okutomi et al. |
| 2006/0039690 | A1 | 2/2006 | Steinberg et al. |
| 2006/0093212 | A1 | 5/2006 | Steinberg et al. |
| 2006/0098237 | A1 | 5/2006 | Steinberg et al. |
| 2006/0098890 | A1 | 5/2006 | Steinberg et al. |
| 2006/0098891 | A1 | 5/2006 | Steinberg et al. |
| 2006/0119710 | A1 | 6/2006 | Ben-Ezra et al. |
| 2006/0120599 | A1 | 6/2006 | Steinberg et al. |
| 2006/0125938 | A1 | 6/2006 | Ben-Ezra et al. |
| 2006/0140455 | A1 | 6/2006 | Costache et al. |
| 2006/0170786 | A1 | 8/2006 | Won |
| 2006/0171464 | A1 | 8/2006 | Ha |
| 2006/0187308 | A1 | 8/2006 | Lim et al. |
| 2006/0204034 | A1 | 9/2006 | Steinberg et al. |
| 2006/0285754 | A1 | 12/2006 | Steinberg et al. |
| 2007/0025714 | A1 | 2/2007 | Shiraki |
| 2007/0058073 | A1 | 3/2007 | Steinberg et al. |
| 2007/0083114 | A1 | 4/2007 | Yang et al. |
| 2007/0086675 | A1 | 4/2007 | Chinen et al. |
| 2007/0097221 | A1 | 5/2007 | Stavely et al. |
| 2007/0110305 | A1 | 5/2007 | Corcoran et al. |
| 2007/0147820 | A1 | 6/2007 | Steinberg et al. |
| 2007/0201724 | A1 | 8/2007 | Steinberg et al. |
| 2007/0234779 | A1 | 10/2007 | Hsu et al. |
| 2007/0269108 | A1 | 11/2007 | Steinberg et al. |
| 2007/0296833 | A1 | 12/2007 | Corcoran et al. |
| 2008/0012969 | A1 | 1/2008 | Kasai et al. |
| 2008/0037827 | A1 | 2/2008 | Corcoran et al. |
| 2008/0037839 | A1 | 2/2008 | Corcoran et al. |
| 2008/0043121 | A1 | 2/2008 | Prilutsky et al. |
| 2008/0175481 | A1 | 7/2008 | Petrescu et al. |

(56) References Cited

U.S. PATENT DOCUMENTS

| | | |
|---|---|---|
| 2008/0211943 A1 | 9/2008 | Egawa et al. |
| 2008/0219581 A1 | 9/2008 | Albu et al. |
| 2008/0219585 A1 | 9/2008 | Kasai et al. |
| 2008/0220750 A1 | 9/2008 | Steinberg et al. |
| 2008/0231713 A1 | 9/2008 | Florea et al. |
| 2008/0232711 A1 | 9/2008 | Prilutsky et al. |
| 2008/0240555 A1 | 10/2008 | Nanu et al. |
| 2008/0292193 A1 | 11/2008 | Bigioi et al. |
| 2008/0309770 A1 | 12/2008 | Florea et al. |
| 2009/0003652 A1 | 1/2009 | Steinberg et al. |
| 2009/0009612 A1 | 1/2009 | Tico et al. |
| 2009/0080713 A1 | 3/2009 | Bigioi et al. |
| 2009/0080796 A1 | 3/2009 | Capata et al. |
| 2009/0080797 A1 | 3/2009 | Nanu et al. |
| 2009/0179999 A1 | 7/2009 | Albu et al. |

FOREIGN PATENT DOCUMENTS

| | | |
|---|---|---|
| DE | 10107004 A1 | 9/2002 |
| EP | 0 944 251 A | 9/1999 |
| EP | 1583033 A2 | 10/2005 |
| EP | 1779322 B1 | 1/2008 |
| EP | 1429290 B1 | 7/2008 |
| JP | 10285542 A2 | 10/1998 |
| JP | 11327024 A2 | 11/1999 |
| JP | 2008520117 T | 6/2008 |
| WO | 98-43436 A | 10/1998 |
| WO | WO-0245003 A1 | 6/2002 |
| WO | WO-03071484 A1 | 8/2003 |
| WO | WO-2004001667 A2 | 12/2003 |
| WO | WO-2004036378 A2 | 4/2004 |
| WO | WO-2006050782 A1 | 5/2006 |
| WO | WO-2007093199 A2 | 8/2007 |
| WO | WO-2007093199 A3 | 8/2007 |
| WO | WO-2007142621 A1 | 12/2007 |
| WO | WO-2007143415 A2 | 12/2007 |
| WO | WO-2008017343 A1 | 2/2008 |
| WO | WO-2008131438 A2 | 10/2008 |
| WO | WO 2008/151802 A1 | 12/2008 |
| WO | WO-2009036793 A1 | 3/2009 |

OTHER PUBLICATIONS

Bates et al., "Some Implications of Zero Sheets for Blind Deconvolution and Phase Retrieval", J. Optical Soc. Am. A, 1990, pp. 468-479, vol. 7.

Ben Ezra, Moshe et al., "Motion Deblurring Using Hybrid Imaging", Proceedings IEEE Computer Society Conference on Computer Vision and Pattern Recognition, 2003.

Ben-Ezra, M. el al., "Motion-Based Motion Deblurring", IEEE Transactions on Pattern Analysis and Machine Intelligence, 2004, pp. 689-698, vol. 26—Issue 6.

Bennett, Eric P. et al., "Video Enhancement Using Per-Pixel Virtual Exposures", International Conference on Computer Graphics and Interactive Techniques, ACM Siggraph, 2005, pp. 845-852.

Bones et al., "Deconvolution and Phase Retrieval With Use of Zero Sheets", J. Optical Soc. Am. A, 1995, pp. 1,842-1,857, vol. 12.

Cannon M., "Blind Deconvolution of Spatially Invariant Image Blurs with Phase," IEEE Transactions on Acoustics, Speech, and Signal Processing, 1976, vol. ASSP-24, No. 1.

Chen-Kuei Y. et al., "Color image sharpening by moment-preserving technique", Signal Processing, 1995, pp. 397-403, vol. 45—Issue 3, Elsevier Science Publishers.

Co-pending U.S. Appl. No. 11/573,713, filed Apr. 9, 2009 by Inventor Ciuc Miha.

Co-pending U.S. Appl. No. 12/026,484, filed Feb. 5, 2008 by Inventor Capata Adrian.

Co-pending U.S. Appl. No. 12/063,089, filed Feb. 6, 2008 by Inventor Petrescu Stefan.

Co-pending U.S. Appl. No. 12/116,140, filed May 6, 2008 by Inventor Albu Felix.

Co-pending U.S. Appl. No. 12/330,719, filed Dec. 9, 2008 by Inventor Susanu George.

Co-pending U.S. Appl. No. 12/354,707, filed Jan. 15, 2009 by Inventor Catalina Neghina.

Crowley, J. et al., "Multi-modal tracking of faces for video communication, http://citeseer.ist.psu.edu/crowley97multimodal.html", In Computer Vision and Patent Recognition, 1997.

Deller J. et al., "Discrete-Time Processing of Speech Signals," 1999, 2nd. Edition, Wiley-IEEE Press.

Deng G. et al., "The study of logarithmic image processing model and its application to image enhancement," IEEE Trans. on Image Processing, 1995, pp. 506-512, vol. 4.

Dufournaud et al., "Matching Images With Different Resolutions", IEEE Conference Proceedings on Computer Vision and Pattern Recognition, 2000.

Elad et al., "Restoration of a Single Superresolution Image from several Blurred, Noisy and Undersampled Measured Images", IEEE Transactions on Image Processing, 1997, vol. 6—Issue 12.

Elad, Michael et al., "Superresolution Restoration of an Image Sequence: Adaptive Filtering Approach", IEEE Transactions on Image Processing, 1999, pp. 529-541, vol. 8—Issue 3.

Favaro, Paolo, "Depth from focus/defocus, http://homepages.inf.ed.ac.uk/rbf/Cvonline/LOCAL_COPIES/FAVARO1/dfdtutorial.html.", 2002.

Final Office Action mailed Nov. 5, 2008, for U.S. Appl. No. 10/986,562, filed Nov. 10, 2004.

Final Office Action mailed Nov. 13, 2008, for U.S. Appl. No. 10/985,657, filed Nov. 10, 2004.

Final Office Action mailed Nov. 13, 2008, for U.S. Appl. No. 11/566,180, filed Dec. 1, 2006.

Final Office Action mailed Nov. 24, 2008, for U.S. Appl. No. 10/985,650, filed Nov. 10, 2004.

Fujita K. et al., An edge-adaptive iterative method for image restoration, Singapore ICCS/ISITA '92."Communications on the Move" Singapore Nov. 16-20, 1992, New York, NY, USA, IEEE, US, Nov. 16, 1992,pp. 361-365, XP010066997, ISBN: 0-7803-0803-4.

Golub G. H. et al., "Matrix Computations," 1996, 3rd edition, John Hopkins University Press, Baltimore.

Gunturk et al., "High-Resolution Image Reconstruction from Multiple Differently Exposed Images," IEEE Signal Processing Letters, 2006, vol. 13, No. 4.

Hayes M., "Statistical Digital Signal Processing and Modeling," 1996, Wiley.

Haykin S., "Adaptive filter theory," 1996, Prentice Hall.

Jannson, Peter A., "Deconvolution of Images and Spectra," 1997, 2nd. Edition, Academic Press.

Jansson, Peter A., "Chapter 1: Convolution and Related Concepts", Deconvolution of Images and Spectra, 1997, 2nd. Edition, Academic Press.

Jiang, Wei et al., "Dense Panoramic Imaging and 3D Reconstruction by Sensors Fusion, http://rlinks2.dialog.com/NASApp/ChannelWEB/DialogProSerylet?ChName=engineering", Japan Sci. and Technol. Agency, JPN(JST); National Inst. Industrial Safety, JPN Nippon Kikai Gakkai Robotikusu, Mekatoronikusu Koenkai Koen Ronbunshu (CD-ROM), 2006, pp. 2P1-C15.

Jourlin M. et al., "Logarithmic image processing the mathematical and physical framework for the representation and processing of transmitted images," Advances in Imaging and Electron Physics, 2001, pp. 129-196, vol. 115.

Kuglin C. D. et al., "The phase correlation image alignment method," Proc. Int. Conf. Cybernetics and Society, 1975, pp. 163-165, IEEE, Bucharest, Romania.

Lagendijk R. L. et al., "Iterative Identification and Restoration of Images," 1991, Kluwer Academic.

Lane et al., "Automatic multidimensional deconvolution", J. Opt. Soc. Am. A, 1987, pp. 180-188, vol. 4—Issue 1.

Lhuillier, M. et al., "A quasi-dense approach to surface reconstruction from uncalibrated images, http://rlinks2.dialog.com/NASApp/ChannelWEB/DialogProServlet?ChName=engineering", IEEE Transactions on Pattern Analysis and Machine Intelligence, 2005, pp. 418-433, vol. 27—Issue 3, IEEE Comput. Soc.

Lu Yuan et al, "Image Deblurring with Blurred/Noisy Image Pairs," SIGGRAPH07, Aug. 5-9, 2007.

(56) References Cited

OTHER PUBLICATIONS

Pickup, Lyndsey et al., "Optimizing and Learning for Super-resolution," BMVC, Sep. 4-7, 2006.
Mase, Mitsuhito et al., "A Wide Dynamic Range CMOS tmage Sensor with Multiple Exposure-Time Signal Outputs and 12-bit Column-Parallel Cyclic A/D Converters", IEEE Journal of Solid-State Circuits, 2005, vol. 40—Issue 12.
Non-Final Office Action mailed Apr. 3, 2008, for U.S. Appl. No. 10/985,650, filed Nov. 10, 2004.
Non-Final Office Action mailed Apr. 4, 2008, for U.S. Appl. No. 10/986,562, filed Nov. 10, 2004.
Non-Final Office Action mailed Apr. 21, 2009, for U.S. Appl. No. 10/985,650, filed Nov. 10, 2004.
Non-Final Office Action mailed Apr. 22, 2009, for U.S. Appl. No. 10/986,562, filed Nov. 10, 2004.
Non-Final Office Action mailed Jun. 1, 2009, for U.S. Appl. No. 10/985,657, filed Nov. 10, 2004.
Non-Final Office Action mailed Jun. 10, 2009, for U.S. Appl. No. 11/566,180, filed Dec. 1, 2006.
Non-Final Office Action mailed Mar. 18, 2008, for U.S. Appl. No. 10/985,657, filed Nov. 10, 2004.
Non-Final Office Action mailed Mar. 21, 2008, for U.S. Appl. No. 11/566,180, filed Dec. 1, 2006.
Non-Final Office Action mailed May 11, 2009, for U.S. Appl. No. 12/199,680, filed Aug. 27, 2008.
Non-Final Office Action mailed May 29, 2009, for U.S. Appl. No. 12/199,710, filed Aug. 27, 2008.
Oppenheim, A.V. et al., "The Importance of Phase in Signals, XP008060042, ISSN: 0018-9219.", Proceedings of the IEEE, 1981, pp. 529-541, vol. 69—Issue 5.
Park, Sung Cheol et al., "Super-resolution image reconstruction: a technical overview, ISSN: 1053-5888. DOI: 10.1109/MSP.2003.1203207.", Signal Processing Magazine, 2003, pp. 21-36, vol. 20—Issue 3, IEEE Publication.
Patti A. et al., "Super-Resolution video reconstruction with arbitrary sampling lattices and non-zero aperture time http://citeseer.ist.psu.edu/patti97super.html", In IEEE Transactions on Image Processing, 1997, pp. 1064-1078.
PCT International Preliminary Report on Patentability for PCT Application PCT/US2007/069638, dated Dec. 10, 2008, 5 pages.
PCT International Preliminary Report on Patentability, for PCT Application No. PCT/EP2005/011011, dated Jan. 22, 2007, 8 pages.
PCT Notification of Transmittal of the International Search Report and the Written Opinion of the International Searching Authority, or the Declaration for PCT application No. PCT/US2007/069638, dated Mar. 5, 2008, 9 pages.
PCT Notification of Transmittal of the International Search Report and the Written Opinion of the International Searching Authority, or the Declaration, for PCT Application No. PCT/EP2005/011011, dated Apr. 24, 2006, 12 pages.
PCT Notification of Transmittal of the International Search Report and the Written Opinion of the International Searching Authority, or the Declaration, for PCT Application No. PCT/EP2007/009939, dated May 21, 2008, 13 pages.
PCT Written Opinion of the International Preliminary Examining Authority, PCT/EP2005/011011, dated Oct. 24, 2006, 4 pages.
Pulli, Kari et al., "Robust Meshes from Multiple Range Maps, http://citeseer.ist.psu.edu/pulli97robust.html", In Proc. IEEE International Conference on Recent Advances in 3-D Digital Imaging and Modeling, 1997.
Rahgozar et al., "Motion Estimation Based on Time-Sequentially Sampled Imagery", IEEE Transactions on Image Processing, 1995.
Rav-Acha, A. et al., "Restoration of Multiple Images with Motion Blur in Different Directions, XP002375829, ISBN: 0-7695-0813-8", Proceedings Fifth IEEE Workshop on Applications on Computer Vision IEEE Comput. Soc, 2000, pp. 22-28.
Sasaki et al., "A Wide Dynamic Range CMOS Image Sensor with Multiple Short-Time Exposures", IEEE Proceedings on Sensors, 2004, pp. 967-972, vol. 2.
Schultz, Richard R. et al., "Extraction of High-Resolution Frames from Video Sequences, http://citeseer.ist.psu.edu/schultz96extraction.html", IEEE transactions on image processing, 1996, pp. 996-1011.
Seldin et al., "Iterative blind deconvolution algorithm applied to phase retrieval", J. Opt. Soc. Am. A, 1990, pp. 428-433, vol. 7—Issue 3.
She, Peng et al., "Motion View Reconstruction Method with Real Object Image based on Virtual Object Movement, http://rlinks2.dialog.com/NASApp/ChannelWEB/DialogProServlet?ChName=engineering", Eizo Joho Media Gakkai Gijutsu Hokoku, 2005, pp. 67-70, vol. 29—Issue 17.
Siu, Angus et al., "Image registration for image-based rendering, http://rlinks2.dialog.com/NASApp/ChannelWEB/DialogProServlet?ChName=engineering", IEEE Transactions on Image Processing , 2005, pp. 241-252, vol. 14—Issue 2.
Trussell, H.J. et al., "Identification and restoration of spatially variant motion blurs in sequential images, XP002375828", IEEE Transactions on Image Processing, 1992, pp. 123-126, vol. 1—Issue 1.
Zhang, Junping et al., "Change detection for the urban area based on multiple sensor information fusion, http://rlinks2.dialog.com/NASApp/ChannelWEB/DialogProServlet?ChName=engineering", IEEE International Geoscience and Remote Sensing Symposium, 2005, p. 4, IEEE.
PCT Notification of Transmittal of the International Search Report and the Written Opinion of the International Searching Authority, or the Declaration, PCT/EP2008/004729, dated Oct. 29, 2008, 9 pages.
Bhaskaran, V. et al., "Motion Estimation Using a Computation-Constrained Criterion," digital Signal Processing Proceedings, DSP '97, 13 Intl. Conf. on Santorini, IEEE, vol. 1, Jul. 2, 1997, pp. 229-232.
Deever, A., "In-Camera All-Digital Video Stabilization," Proc. of the Intl. Conf. on Decision Support Systems, Proc. of ISDSS, XX, XX, Jan. 1, 2006, pp. 190-193.
Demir, B. et al., Block Motion Estimation Using Adaptive Modified Two-Bit Transform, Jun. 5, 2007, vol. 1, No. 2, Jun. 5, 2007, pp. 215-222.
Aaron Deever, In-camera, all-digital video stabilization, in proc. ICIS'06, Rochester, New York, May 2006, pp. 190-193.
K. Sauer and B. Schwartz, 1996, Efficient Block Motion Estimation Using Integral Projections, IEEE Trans. Circuits, Systems for video Tech., vol. 6, No. 5, Oct. 1996, pp. 513-518.
K. Uomori, A. Morimura, H. Ishii, T. Sakaguchi and Y. Kitamura, Automatic image stabilizing system by full-digital signal processing. IEEE Transactions on Consumer Electronics, Aug. 3, 1990, vol. 36, No. 3, pp. 510-519.
S. Ko, S. Lee, S. Jeon, and E. Kang. Fast digital image stabilizer based on gray-coded bit-plane matching, IEEE Transactions on Consumer Electronics, Aug. 1999, vol. 45, No. 3, pp. 598-603.
B. Natarajan, V. Bhaskaran, and K. Konstantinides, Low-complexity block-based motion estimation via one-bit transforms, IEEE Trans. Circuit Syst. Video Technol., Aug. 1997, vol. 7, No. 5, pp. 702-706.
J. Feng, K.-T. Lo, H. Mehrpour, and A. E. Karbowiak, Adaptive block matching motion estimation algorithm using bit plane matching, in Proc. ICIP' 1995, pp. 496-499.
Final Office Action mailed Mar. 25, 2011, for U.S. Appl. No. 11/764,578, filed Jun. 18, 2007.
Final Office Action mailed May. 27, 2010, for U.S. Appl. No. 11/753,098, filed May 24, 2007.
Non-Final Office Action mailed Dec. 7, 2010, for U.S. Appl. No. 11/764,578, filed Jun. 18, 2007.
Non-Final Office Action mailed Jan. 20, 2010, for U.S. Appl. No. 11/690,836, filed Mar. 25, 2007.
Non-Final Office Action mailed Mar. 21, 2011, for U.S. Appl. No. 12/702,092, filed Feb. 8, 2010.
Non-Final Office Action mailed Nov. 4, 2009, for U.S. Appl. No. 11/753,098, filed May 24, 2007.
Notice of Allowance mailed Apr. 29, 2010, for U.S. Appl. No. 11/690,836, filed Mar. 25, 2007.
Notice of Allowance mailed Dec. 1, 2009, for U.S. Appl. No. 12/199,680, filed Aug. 27, 2008.
Notice of Allowance mailed Dec. 11, 2009, for U.S. Appl. No. 12/199,710, filed Aug. 27, 2008.

(56) References Cited

OTHER PUBLICATIONS

Notice of Allowance mailed Nov. 2, 2009, for U.S. Appl. No. 10/985,657, filed Nov. 10, 2004.
Notice of Allowance mailed Nov. 17, 2009, for U.S. Appl. No. 11/566,180, filed Dec. 1, 2006.
Notice of Allowance mailed Oct. 29, 2009, for U.S. Appl. No. 10/985,650, filed Nov. 10, 2004.
Notice of Allowance mailed Oct. 29, 2009, for U.S. Appl. No. 10/986,562, filed Nov. 10, 2004.

PCT Notification of Transmittal of the International Search Report and the Written Opinion of the International Searching Authority, or the Declaration for PCT application No. PCT/EP2009/008674, dated Mar. 29, 2010, 10 pages.
PCT International Preliminary Report on Patentability Chapter I (IB/373), for PCT Application No. PCT/EP2008/004729, dated Dec. 17, 2009, 10 pages.
PCT Written Opinion of the International Search Authority, for PCT Application No. PCT/EP2008/004729, dated Dec. 17, 2009, 9 pages.

\* cited by examiner

FAST MOTION ESTIMATION METHOD

PRIORITY

This application claims the benefit of priority to U.S. provisional patent application 60/944,046, filed Jun. 14, 2007, which is incorporated by reference.

BACKGROUND

1. Field of the Invention

The invention is in the field of motion estimation for frame stabilization using image-processing techniques. It is desired to have a technique with reduced complexity and that is suitable for hardware implementations. It is also desired to have a technique that can be used for fast global and local motion estimation, as well as image registration.

2. Description of the Related Art

Video sequences are known to be captured with hand-held digital still cameras often containing unwanted motion as a result of hand jitter. The motion caused by hand jitter can reduce the quality of the recorded video sequences. This movement is a biological phenomenon and the effect it has on the recorded video sequences is amplified by small and light-weight modern cameras. To reduce the influence of the hand-jitter motion, multiple image stabilization approaches have been proposed. When selecting one, a trade-off is to be made between different parameters of the system such as weight, performance, and cost.

One approach is optical image stabilization (OIS) which provides high performance. However, OIS is an expensive solution, and it has been used on high-end digital single lens reflex cameras, video cameras, and binoculars.

A second approach is electronic image stabilization (EIS) which involves use of extra hardware such us gyroscopic sensors. Gyroscopes are used to detect and measure the amplitude of the hand jitter and the image is shifted in software by a certain number of pixels. The system using gyroscopes has an advantage over optical image stabilization because there are no moving parts, and the power dissipation is much lower. Although continuously shrinking in size and price, the use of gyroscopic sensors is still an expensive option for camera or phones manufactures.

In the paper by Aaron Deever, entitled "In-camera all-digital video stabilization", published in ICIS'06 conference, Rochester, May 2006, the problem of video stabilization was investigated with particular focus on in-camera, all-digital video stabilization or digital image stabilization (DIS). Algorithms for global camera motion estimation and jitter calculation were proposed by Deever. Computational constraints imposed by an in-camera solution are also discussed.

An image stabilizing apparatus for correcting motion of an image recording apparatus by using a bit-plane matching technique, and an image stabilizing method, are described in U.S. Pat. No. 6,535,244, entitled, "Image stabilizing apparatus using bit-plane Matching and Image Stabilizing Method Using the Same". In the image stabilizing apparatus, a field memory stores input digital image information. A motion detecting circuit calculates an amount of movement of input image information between two screens by using bit-plane matching technique and outputs a motion vector of the image recording apparatus. A motion correcting circuit corrects the motion of the image recording apparatus by moving image information stored in the field memory in an opposite direction to the direction of the motion vector.

A method and apparatus for motion estimation is also described in United States published patent application no. US2006/171464. A method and apparatus are described for motion estimation in which the amount of computation can be reduced. The method for motion estimation includes storing an interblock match difference calculated for a previous matching block to be motion estimated. An interblock match difference is calculated for a current matching block to be motion estimated using the stored interblock match difference. Motion estimation is performed on the current matching block using the interblock match difference calculated for the current matching block.

SUMMARY OF THE INVENTION

A digital image stabilization method is provided. A sequence of temporally proximate image frames is acquired. An estimated total camera motion between the image frames is computed. A desired component of the estimated total camera motion is determined including distinguishing an undesired component of the estimated total camera motion, and including characterizing vector values of motion between the image frames. A counter is incremented for each pixel group having a summed luminance that is greater than a first threshold. The counter is decremented for each pixel group having a summed luminance that is less than a second threshold. The first and second thresholds are determined as percentages of a dynamic luminance range of the sequence. The desired camera motion is computed including representing the vector values based on final values of counts for the image frames. A corrected image sequence is generated including the desired component of the estimated total camera motion, and excluding the undesired component. The corrected image sequence or a further processed version, is rendered, stored, displayed, transmitted and/or transferred.

A further digital image stabilization method is provided. A sequence of temporally proximate image frames is acquired. An estimated total camera motion between the image frames is computed. A desired component of the estimated total camera motion is determined including distinguishing an undesired component of the estimated total camera motion, and including characterizing vector values of motion between the image frames. A counter is incremented for each pixel group having a summed luminance that is greater than a threshold. The threshold is determined based on a dynamic luminance range of the sequence. The desired camera motion is computed including representing the vector values based on final values of counts for the image frames. A corrected image sequence is generated including the desired component of the estimated total camera motion, and excluding the undesired component. The corrected image sequence or a further processed version, is rendered, stored, displayed, transmitted and/or transferred.

Binary incrementation may be applied in the method. A bit 1 may be generated for a vector element that is above the threshold. A bit 0 may be generated for a vector element that is not above the threshold. An exclusive OR operation may be applied between a first binary vector and a delayed version of another binary vector. The method may include applying low pass temporal filtering.

The first and second groups of pixels may include one or more rows or columns of pixels. The undesired component of the estimated total camera motion may include a jitter component. The method may include compensating for the jitter component through an image shift/warp function. The desired component of the estimated total camera motion may include a panning component.

BRIEF DESCRIPTION OF THE DRAWINGS

FIG. 2b is a plot that illustrates an average magnitude distance function for the horizontal projection vectors of FIG. 2a.

FIG. 4b is a plot illustrating an average magnitude distance function for the horizontal sign projection vectors of FIG. 4a.

DETAILED DESCRIPTION OF THE EMBODIMENTS

Techniques for estimating global motion between two consecutive images of a movie are provided. The technique can also be used for image registration. It is very fast and simple to implement because it uses mostly bit operations. It doesn't use any multiplications, sum of absolute values.

Implementations: Matlab code and In-camera hardware implementation. The software required to estimate the displacements may include a C demo.

Global Motion Estimation Techniques for Image Stabilization

Two categories of global motion estimation methods are proposed. The first one, called Sign Projection (SP) is obtained by modifying the integral projection estimation method using two thresholds for pixel values. The second category, called binary incrementation (BI), is obtained by using only one threshold for generating binary vectors from two images. It is shown that the proposed approaches provide similar motion estimation accuracy with the integral projection (IP) and phase correlation (PC) methods. Also, they have reduced numerical complexity and memory requirements, leading to shorter processing times as well as lower power consumption.

Unlike the techniques described briefly in the background above, the embodiment described hereunder relate use digital image stabilization (DIS) techniques in order to determine an undesired image jitter and shake and compensate by digitally shifting pixel data. These methods do not need extra hardware and the power consumption can be extremely reduced. The methods presented in this paper are particularly advantageous in devices with limited computational power or memory. One such device is a mobile phone equipped with a digital camera. The optical image stabilization is not a viable solution, because the mobile phone has to support heavy shocks. The electronic image stabilization adds extra hardware costs and complicates the mobile phone design. Therefore, in this case, the most efficient stabilization system is the digital image stabilization.

In this paper, the captured video data is stabilized prior to compression and storage. The proposed methods estimate the global motion that indicates the relative motion of the camera with respect to the image background. Global motion estimation has been largely used in video coding or video analysis applications. All the stabilization techniques presented in this paper are not suitable for local motion estimation.

Figure 1:
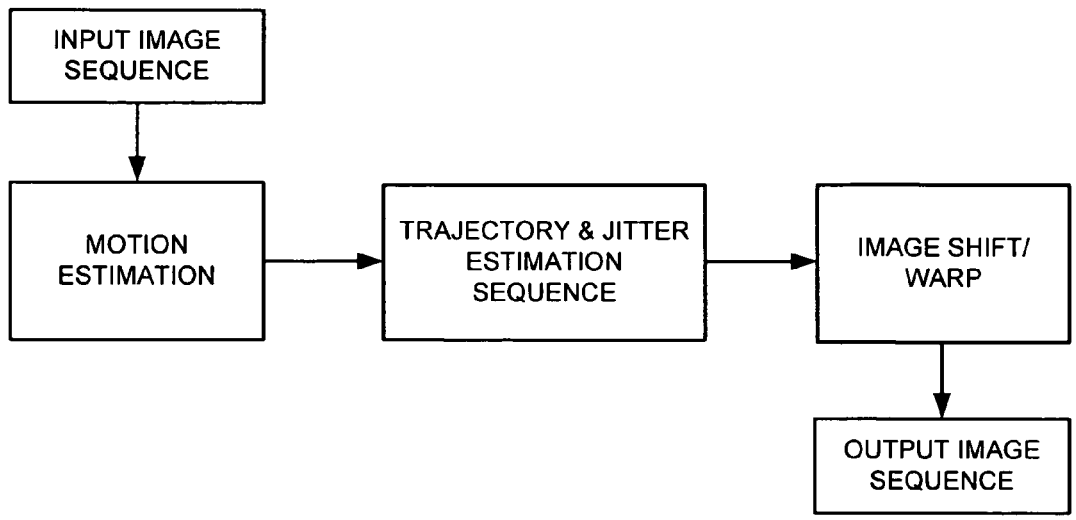
FIG. 1 schematically illustrates in a block diagram an image stabilization method in accordance with certain embodiments.

Motion estimation is known to be one of the most computation intensive parts of video systems. A typical image stabilization algorithm is illustrated in FIG. 1. FIG. 1 illustrates an image stabilization algorithm involving receiving an image by way of an image input sequence and output of a modified image by way of an output image sequence. The illustrated method includes motion estimation, wherein the motion between frames is estimated using the input image sequence. The illustrated method involves a trajectory and jitter estimation sequence, wherein the desired camera motion is computed. The components caused by camera jitter and camera pan are distinguished. Jitter is estimated and compensated through an image shift or warp function.

Motion estimation may be provided using a block-matching algorithm (BMA), in which image frames are divided into non-overlapping rectangular blocks. The best match to the current block of pixels is searched for in the previous frame of the sequence within a certain search area in respect to the location of the current block. The optimal search is called the full search (FS) algorithm and searches locations to find the best match. A related article J. Feng, K.-T. Lo, H. Mehrpour, and A. E. Karbowiak, entitled "Adaptive block matching motion estimation algorithm using bit plane matching," in Proc. ICIP', 1995, pp. 496-499 is incorporated by reference. The average magnitude distance function (AMDF) can be considered in the matching process. Basically, the vectors "slide" one over the other and the sum of the absolute difference is computed. The full search technique is complex.

Simpler, sub-optimal methods may be used, such us the phase correlation method (see, e.g., Kuglin C D., Hines D C., "The phase correlation image alignment method," in Proc. Int. Conf. Cybernetics and Society, IEEE, Bucharest, Romania, September 1975, pp. 163-165, incorporated by reference) and the integral projection method see K. Sauer and B. Schwartz, 1996, "Efficient Block Motion Estimation Using Integral Projections", IEEE Trans. Circuits, Systems for video Tech., vol. 6, No. 5, October, pp. 513-518, incorporated by reference) have been proposed. The phase correlation method is based on a phase shift theorem. Applying an inverse Fourier transform to the phase shift gives a delta function offset, from which the translational motion in the image pair is found. This technique is robust, but still somewhat complex, because it involves the use of a Fourier transform procedure.

Another technique based on integral projection can be used to obtain a robust estimate of the global motion between two frames. In this further technique, a pair of one-dimensional vectors is computed by summing the elements of each column or row respectively. The projection vectors are correlated to find the best offset corresponding to the matched frames.

Further global motion estimation methods are described below. These descriptions are followed by quantitative analysis of the performance of the preferred methods compared with integral projection and phase correlation methods.

Low Complexity Global Motion Estimation Methods

Figure 2A:
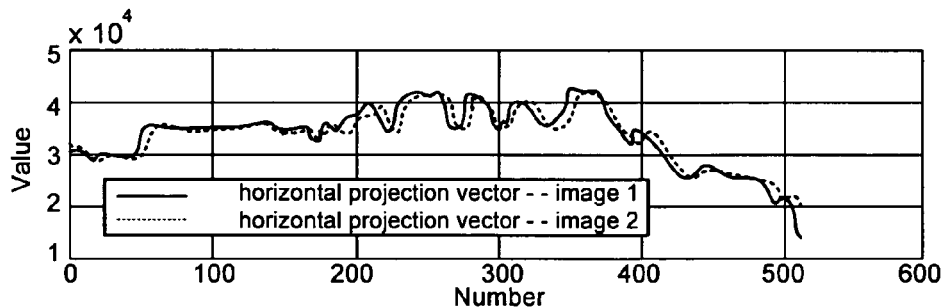
FIG. 2a shows two plots illustrating horizontal projection vectors for two images in a motion sequence.
Figure 2B:
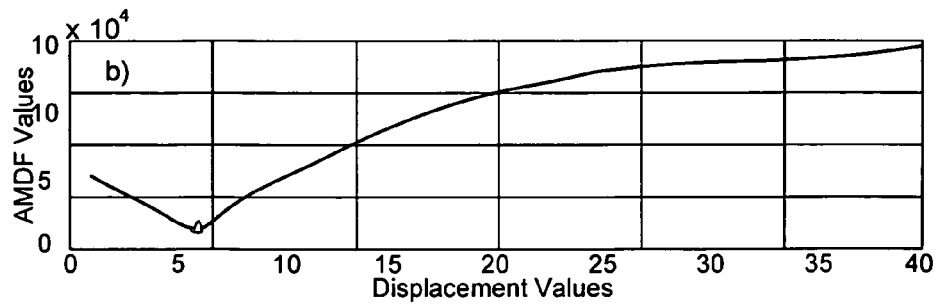

Certain proposed methods are derived from the integral projection method. They are inspired from standard methods used to determine the fundamental frequency of the speech signal (see, e.g., Deller, J. Hansen, J. Proakis, Discrete-Time Processing of Speech Signals, 2nd. edition, Wiley-IEEE Press, 1999, incorporated by reference). For this purpose, the speech signal is "centrally clipped" in order to reduce the dynamic range of the signal and simplify the hardware or software implementation. Further, the complexity is significantly reduced if a level clipping or a limitation function is applied. Then the autocorrelation function or the average magnitude distance function (AMDF) is computed and the fundamental period of the signal is found. FIG. 2A shows two plots of computed horizontal projection vectors. The AMDF values for different displacement values are illustrated by the plot in FIG. 2B. The minimum of this function shows that the horizontal displacement value is 6. It can be observed from FIGS. 2A-2B that the computed projection and AMDF vectors have large values. Therefore, the memory requirements of the integral projection method are high.

Sign Projection Method

A pair of one-dimensional vectors (horizontal and vertical) is computed from the pixel values of each frame or image plane. Instead of summing all elements and obtaining a high final value, e.g., as described by Deevers (incorporated by reference above), a lower value may be obtained by incrementing or decrementing the value based on results of comparisons of elements using one or two (or more) thresholds. This method is referred to as the Sign Projection method. For each row, one is added (+1) to a count if the value on the image plane is higher than a second threshold, while one is subtracted (−1) from a count if the value is lower than a first threshold. These thresholds are computed as a percentage of the dynamic range given by the maximum and minimum values of the image elements. They are symmetric in rapport with the average value of each image. An example obtained for one image row is provided in FIG. 3.

Figure 3:
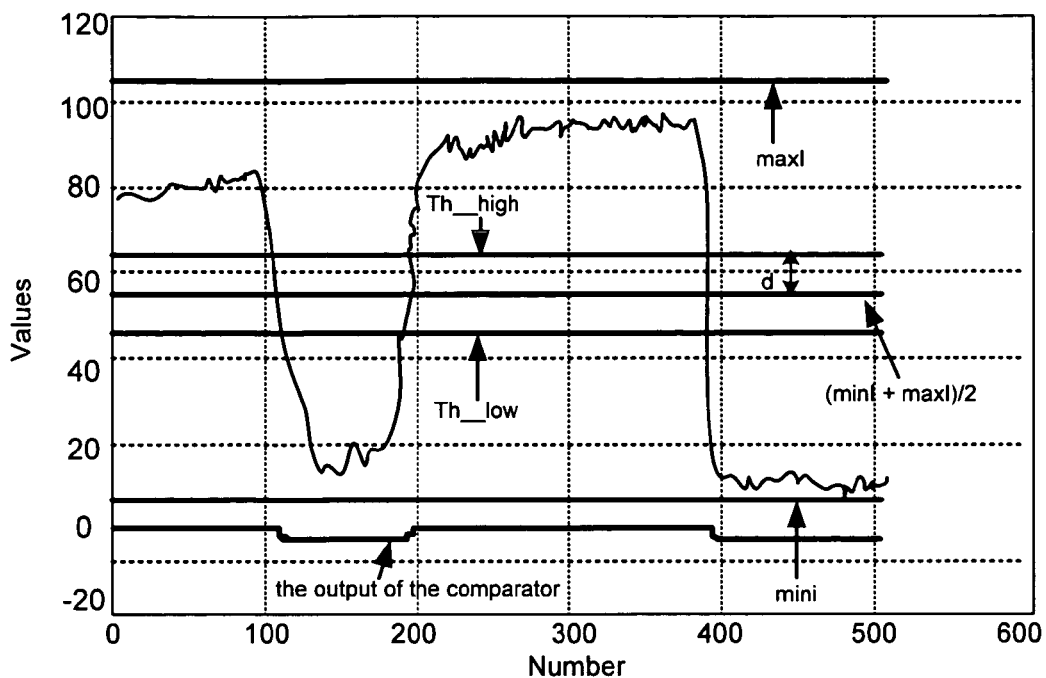
FIG. 3 is a plot of pixel values, indicating a pair of thresholds displaced around the average of a pair of maximum/minimum values, and an output of a comparator for one row.

Referring to FIG. 3, further details as to how the thresholds are determined is now provided for embodiments including two thresholds and alternative embodiments including a single threshold. An average value determined as an average a minimum value minI and a maximum value maxI is provided at a value around 55 in FIG. 3. Two thresholds are separated from this average value by an amount d, where $d=(p-\frac{1}{2})*(maxI-minI)$. So the thresholds are computed as, $Th\_low=(maxI+minI)/2-(p-\frac{1}{2})*(maxI-minI)$, and $Th\_high=(maxI+minI)/2+(p-\frac{1}{2})*(maxI-minI)$, where p is the percentage between 0.5 and 1, minI is the minimum pixel value of the image crop and maxI is the maximum pixel value of the image crop. The output of the comparator is also shown in FIG. 3 only having values between minus one (−1) and plus one (+1).

A preferred range of percentages for the thresholds is between 55% (0.55) and 80% (0.8). It would be smaller for small image crops (e.g. 512×512) and larger for large image crops. There is no optimum percentage, because the accuracy of the results depends on the size of the images, their content, and possible rotations, among other factors. However, typically 60% (0.6) leads to stable results for both situations, i.e., the one and two threshold embodiments. If less than 55% (0.5-0.54) is used, some unstable results have been observed to occur. That is, there would be an undesired probability of obtaining very similar vectors even in case of large displacements between pictures.

An alternative embodiment includes "centrally clipping" the image around a value determined from the histogram of the image (e.g. around the value of its maximum).

In a version with one threshold, generally the lower threshold is used and may be computed as in the two threshold embodiment. A counter counts the number of pixels above the threshold and a vector is obtained. The binary vector is generated as follows: a bit 1 is generated if each vector element is above the vector's average value, while otherwise a bit 0 is generated. Other alternatives for generating the binary vector include comparing the vector's elements with its median value or with half of the sum of its maximum and minimum values.

Figure 4A:
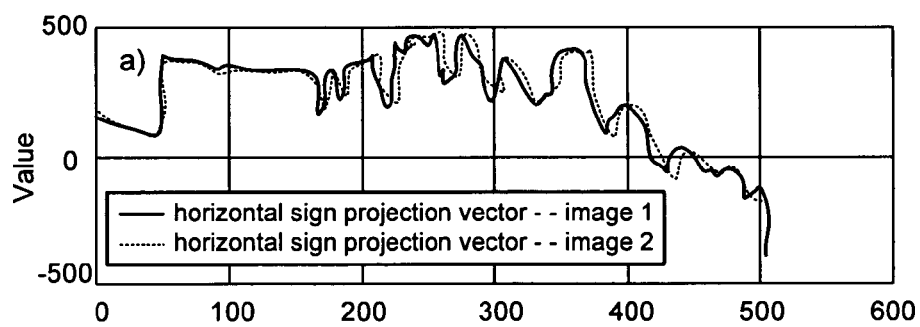
FIG. 4a shows two plots of horizontal sign projection vectors for two images of a motion sequence.
Figure 4B:
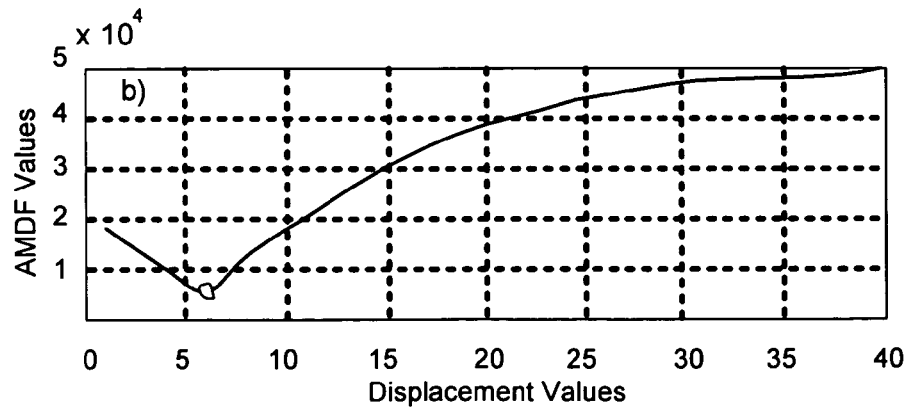

FIG. 4A includes plots illustrating modified horizontal vectors obtained from two images. FIG. 4A illustrates that the dynamic range of the vectors may be reduced by many orders of magnitude in comparison with those of the original method illustrated at FIG. 2A. FIG. 4B illustrates the average magnitude distance function for the horizontal sign projection vectors of FIG. 4A. The maximum possible values of the modified vectors are given by the size of the images. The same displacement value is obtained by the matching process although the dynamic range of the computed AMDF values is much lower than those of the original integral projection method. The operation is repeated for each column in both images. The numerical complexity and memory requirements of the SP method are relatively low. The integer additions are replaced with comparisons and counting is used in the first phase. Also, the dynamic range of variables is much lower in comparison with those of the IP or PC methods. IN certain embodiments, only about five (5) additions and five (5) multiplications are involved in computing the thresholds for both images. The IP method involves about 2 integer additions per pixel, while the complexity of the PC method is higher, because it involves three 2-D FFT's (Fast Fourier Transforms) whose complexity depends on the particular implementation. Also, the estimations are robust in moderating variations of the thresholds.

Binary Incrementation Method

Figure 5A:
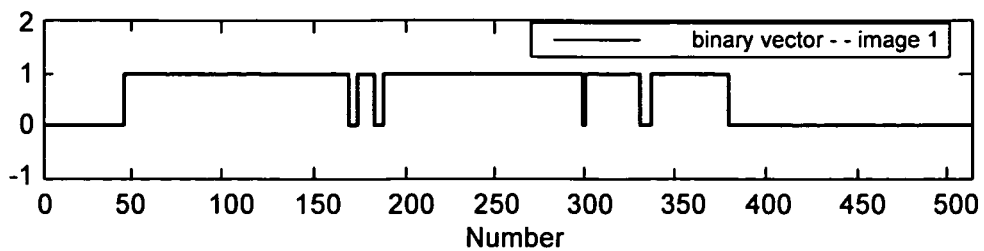
FIGS. 5a-5b illustrates the binary vectors for the two images of FIGS. 4a-4b.
Figure 5B:
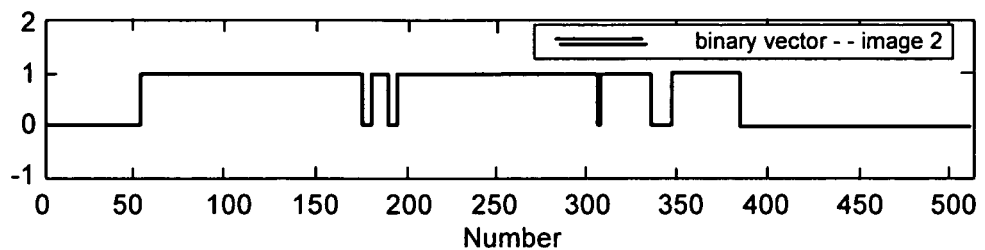

Further significant numerical complexity reduction can be obtained if only one threshold is used. In this alternative embodiment, each pixel value of two consecutive frames is compared with only one threshold. This threshold also depends on the dynamic range of the image values and vectors elements. For each line of the image, a counter counts the number of pixels above the threshold and a vector is obtained. A bit 1 is generated if each vector element is above its average (or median value), and otherwise a bit 0 is generated. The procedure is repeated for each column of the image plane for both images. Therefore, two pairs of binary vectors (corresponding to horizontal and vertical computations) are obtained. An example of such computed binary vectors is shown in FIGS. 5A-5B. Binary vectors for two images are illustrated by the plots of FIGS. 5A-5B.

Figure 6:
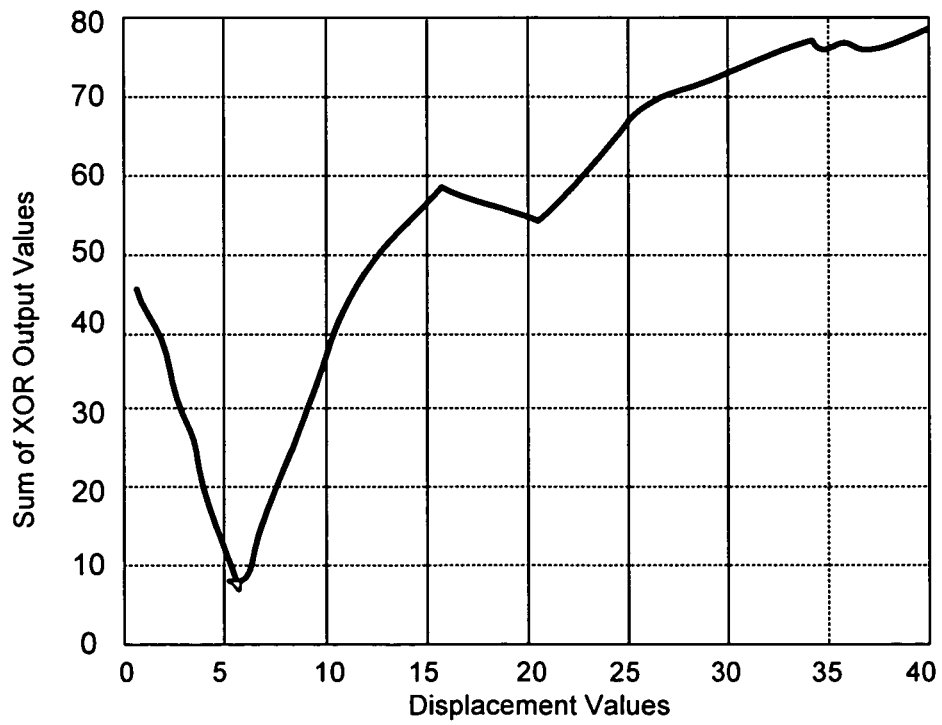
FIG. 6 shows a plot illustrating the sum of XOR output values.

For each pair of binary vectors, an exclusive OR (XOR) operation is performed between one vector and delayed versions of the other vector. The output of the XOR block should be zero in case of a perfect match. The number of bits "1" shows the mismatch between the vectors for different displacement values. The horizontal and vertical displacement values are given by the positions where the output reaches its minimum (e.g., at a displacement value of six (6) in FIG. 6). This is referred to as the global motion estimation method or the binary incrementation method. The numerical complexity and memory requirements of this last method are very low in comparison with similar binary methods as well as with other considered methods. Only slightly more than one comparison per pixel is involved in generating the binary vectors. There is no need to keep the full binary matrices in the memory, unlike methods described in S. Ko, S. Lee, S. Jeon, and E. Kang. Fast digital image stabilizer based on gray-coded bit-plane matching, IEEE Transactions on Consumer Electronics, vol. 45, no. 3, pp. 598-603, August 1999; and B. Natarajan, V. Bhaskaran, and K. Konstantinides, "Low-complexity block-based motion estimation via one-bit transforms," IEEE Trans. Circuit Syst. Video Technol., vol. 7, no. 5, pp. 702-706, August 1997, which are incorporated by reference). Also, there are no multiplications or integer additions needed, although in alternative embodiments they may be used (i.e., such functions are not explicitly excluded). Therefore, very efficient hardware implementations are possible. The method gives robust displacement estimations on sufficiently large regions of both images (e.g., a few hundred samples for each direction).

A low-pass temporal filtering may be next applied. This low-pass temporal filtering serves to assist in removing unwanted hand jitter and retaining any intentional panning movement. A jitter improved calculation method may be used such as that proposed in the Deevers article incorporated by reference above. If A[n] is the accumulated jitter for frame n, v[n] is the computed motion estimate for frame n, and a is the dampening factor, the accumulation formula is as follows:

$$A[n]=\alpha[n-1]+\alpha[n].$$

An improved accumulation formula is better suited to retaining the intentional panning motion. Next, the image shift is performed using the maximum buffer area of the image sensor.

Experiments and Results

Figure 7A:
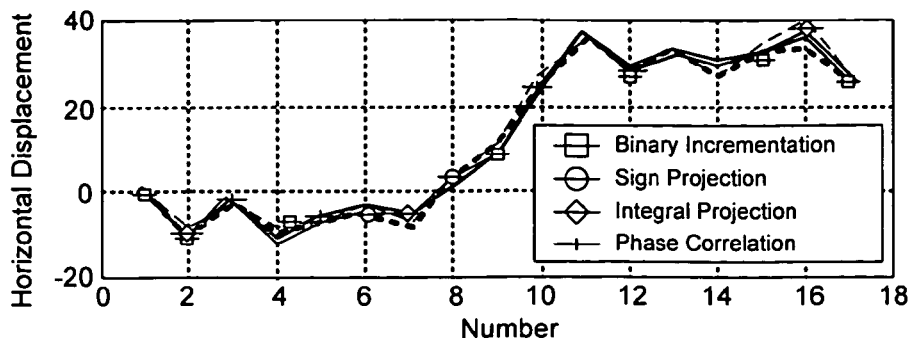
FIG. 7a shows plots of horizontal displacements that are respectively estimated by the BI, SP, IP and PC methods for a burst of multiple images.
Figure 7B:
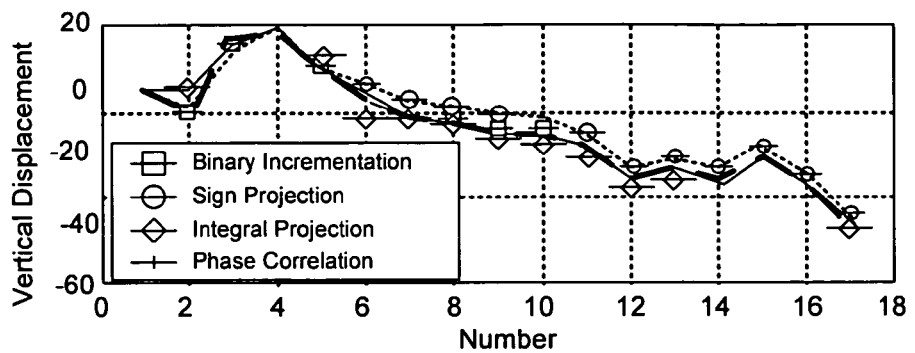
FIG. 7b shows plots of vertical displacements that are respectively estimated by the BI, SP, IP and PC methods for a burst of multiple images.

The inventors have investigated the efficiency of the proposed stabilization methods for recorded short movies or burst sequence pictures. Firstly, the considered methods were tested by computing the displacements between pictures taken by a Nikon D100 camera on burst pictures mode operation. This mode provides a sequence of high quality JPEG pictures, but slightly shifted one to the next, due to the hand jitter. The value of the dampening factor $\alpha$ was 0.95. It can be seen from FIGS. 7A-7B that the global motion values indicated by all methods are close. Some differences are explained by small rotations that occur between consecutive pictures. FIGS. 7A-7B show plots of displacements estimated by the BI, SP, IP and PC methods for a burst of pictures.

Figure 8:
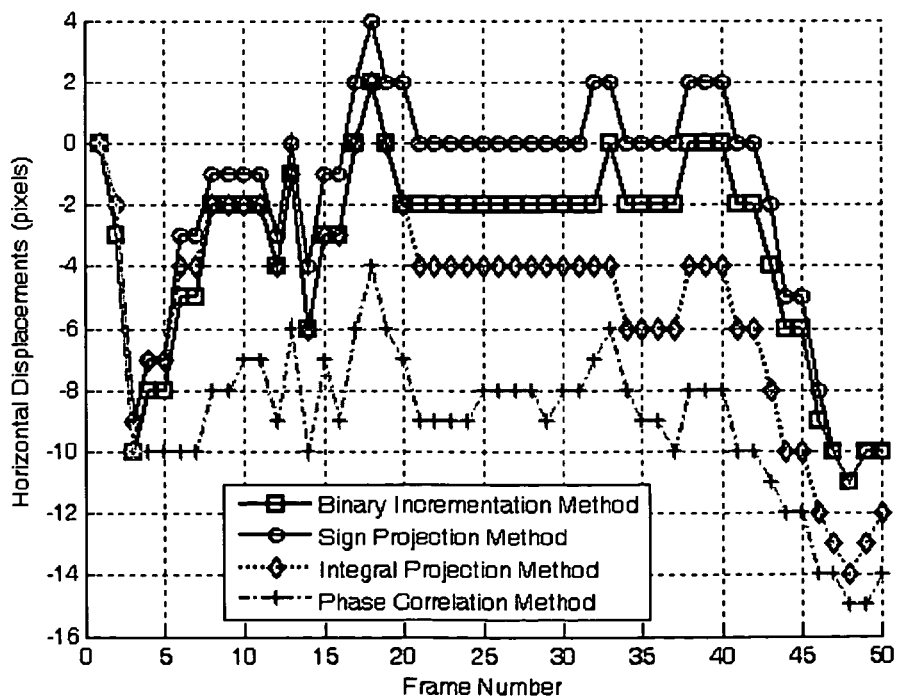
FIG. 8 shows plots of horizontal displacements that are respectively estimated by the BI, SP, IP and PC methods.
Figure 9:
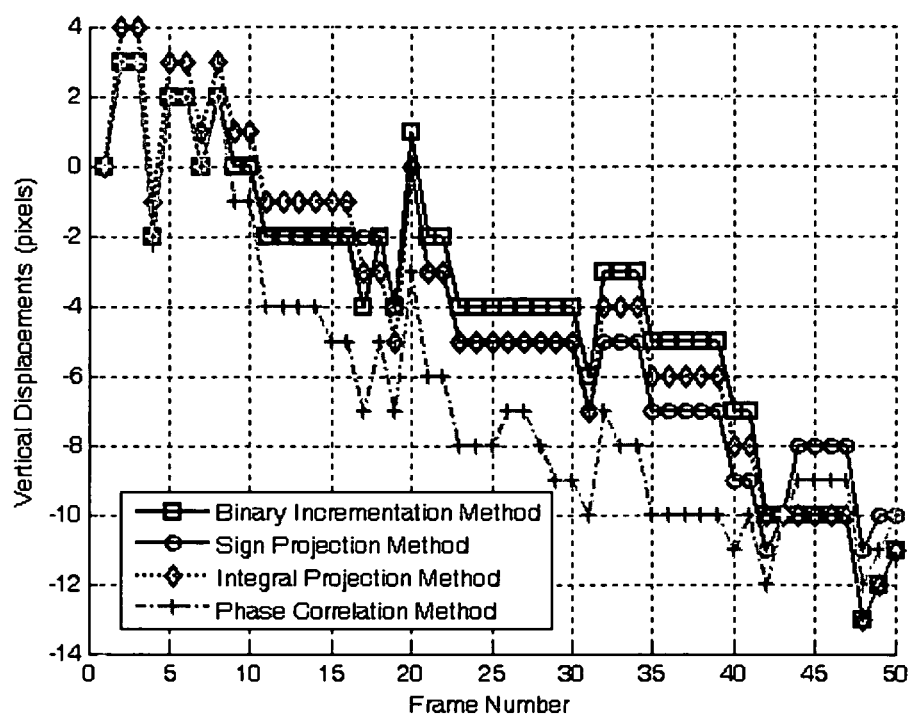
FIG. 9 shows plots of vertical displacements that are respectively estimated by the BI, SP, IP and PC methods.

Next, the considered algorithms were also tested on a lower quality video (320×240 pixels). As shown in FIG. 8 and FIG. 9, there are more differences between the displacement estimates of the considered methods. FIG. 8 illustrates the horizontal displacements estimated by the BI, SP, IP and PC methods, while FIG. 9 illustrates the vertical displacements. The integral projection, sign projection and binary incrementation methods provide displacement estimates that are more sensitive than phase compensation method estimates in case of low quality frame sequences. Furthermore, these methods are affected by luminance variations and small intra-frame movements. Overall, the provided stabilization methods reduce the hand jitter effect and improve the visual quality of a large variety of video sequences. It is noted that, if some individual frames are blurry, the digital image stabilization technique is not designed to itself reduce the perceived blur.

The sign projection and binary incrementation methods described above are provided for global motion estimation. The performance for digital video stabilization is demonstrated to provide advantageously efficient and accurate motion estimation compared with more complex global motion estimation methods. The methods are obtained by central clipping and/or otherwise limiting the pixel values of consecutive frames or images. Due to their simplicity, these methods have an efficient hardware or software implementation. Performance can be further improved for small block sizes.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the appended claims, and structural and functional equivalents thereof.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above herein, as well as the background, invention summary, abstract and brief description of the drawings, are all incorporated by reference into the detailed description of the preferred embodiments as disclosing alternative embodiments.

In addition, the following are incorporated by reference: United States published applications nos. US2006/0204110, US20050068452, US2006/0098890, US2006/0285754, US2007/0189748, and US2007/0269108, and U.S. application Ser. Nos. 11/753,098, 11/752,925, 11/573,713, 10/764,339, 11/624,683, 11/690,836, 11/764,578, 11/856,721, 11/859,164, 10/985,657, 10/985,650, 10/986,652, 61/023,774,60/913,331, and 60/945,558.

The following are also incorporated by reference: K. Uomori, A. Morimura, H. Ishii, T. Sakaguchi and Y. Kitamura. Automatic image stabilizing system by full-digital signal processing. IEEE Transactions on Consumer Electronics, Vol. 36, No. 3, pp. 510-519, August 1990; and "Automatic multidimensional deconvolution" J. Opt. Soc. Am. A, vol. 4(1), pp. 180-188, January 1987 to Lane et al. "Some Implications of Zero Sheets for Blind Deconvolution and Phase Retrieval", J. Optical Soc. Am. A, vol. 7, pp. 468-479, 1990 to Bates et al. Iterative blind deconvolution algorithm applied to phase retrieval", J. Opt. Soc. Am. A, vol. 7(3), pp. 428-433, March 1990. to Seldin et al.; "Deconvolution and Phase Retrieval With Use of Zero Sheets," J. Optical Soc. Am. A, vol. 12, pp. 1,842-1,857, 1995 to Bones et al., "Digital Image Restoration", Prentice Hall, 1977 authored by Andrews, H. C. and Hunt, B. R; and "Motion Deblurring Using Hybrid Imaging", by Moshe Ben-Ezra and Shree K. Nayar, from the Proceedings IEEE Computer Society Conference on Computer Vision and Pattern Recognition, 2003.

What is claimed is:

1. A digital image stabilization method, comprising:
    acquiring a sequence of temporally proximate image frames;

computing an estimated total camera motion between the image frames;
determining a desired component of the estimated total camera motion including distinguishing an undesired component of the estimated total camera motion, and including characterizing vector values of motion between the image frames, including:
  determining at least first and second thresholds adapted to said image frames to generate a sign value range {−1, 0, +1}, including calculating said thresholds as percentages of a dynamic luminance range of the sequence;
  incrementing (+1) a counter for each pixel group having a summed luminance that is greater than a first threshold;
  decrementing (−1) said counter for each pixel group having a summed luminance that is less than a second threshold, wherein the counter is unchanged (0), neither incremented nor decremented, for each pixel group having a summed luminance between the first and second thresholds;
  determining final values of counts for the image frames by summing along rows and columns; and
  representing the vector values of the desired camera motion based on said final values of counts for the image frames;
(d) generating a corrected image sequence including the desired component of the estimated total camera motion, and excluding the undesired component; and
(e) rendering, storing, displaying, transmitting or transferring the corrected image sequence or a further processed version, or combinations thereof.

2. The method of claim 1, wherein one or more of the groups of pixels each comprise one or more rows or columns of pixels.

3. The method of claim 1, wherein one or more of the groups of pixels each comprise a single row or a single column of pixels.

4. The method of claim 1, wherein the undesired component of the estimated total camera motion comprises a jitter component.

5. The method of claim 4, further comprising compensating for said jitter component through an image shift/warp function.

6. The method of claim 1, wherein the desired component of the estimated total camera motion comprises a panning component.

7. The method of claim 6, wherein the undesired component of the estimated total camera motion comprises a jitter component.

8. The method of claim 1, comprising generating an integer sign value 1 for a vector element that is above the first threshold.

9. The method of claim 8, comprising generating an integer sign value −1 for a vector element that is below the second threshold.

10. A digital image acquisition device, comprising optics and a processor for respectively capturing and processing an image, and digital code embedded in one or more storage media including instructions for the processors to perform a digital image stabilization method, wherein the method comprises:
  acquiring a sequence of temporally proximate image frames;
  computing an estimated total camera motion between the image frames;
  determining a desired component of the estimated total camera motion including distinguishing an undesired component of the estimated total camera motion, and including characterizing vector values of motion between the image frames, including:
    determining at least first and second thresholds adapted to said image frames to generate a sign value range {−1, 0, +1}, including calculating said thresholds as percentages of a dynamic luminance range of the sequence;
    incrementing (+1) a counter for each pixel group having a summed luminance that is greater than a first threshold;
    decrementing (−1) said counter for each pixel group having a summed luminance that is less than a second threshold, wherein the counter is unchanged (0), neither incremented nor decremented, for each pixel group having a summed luminance between the first and second thresholds;
    determining final values of counts for the image frames by summing along rows and columns; and
    representing the vector values of the desired camera motion based on said final values of counts for the image frames;
  (d) generating a corrected image sequence including the desired component of the estimated total camera motion, and excluding the undesired component; and
  (e) rendering, storing, displaying, transmitting or transferring the corrected image sequence or a further processed version, or combinations thereof.

11. The device of claim 10, wherein one or more of the groups of pixels each comprise one or more rows or columns of pixels.

12. The device of claim 10, wherein one or more of the groups of pixels each comprise a single row or a single column of pixels.

13. The device of claim 10, wherein the undesired component of the estimated total camera motion comprises a jitter component.

14. The device of claim 13, wherein the method further comprises compensating for said jitter component through an image shift/warp function.

15. The device of claim 10, wherein the desired component of the estimated total camera motion comprises a panning component.

16. The device of claim 15, wherein the undesired component of the estimated total camera motion comprises a jitter component.

17. The device of claim 10, wherein the method further comprises generating an integer sign value 1 for a vector element that is above the first threshold.

18. The device of claim 17, wherein the method further comprises generating an integer sign value −1 for a vector element that is below the second threshold.

19. One or more non-transitory processor-readable storage media having embedded therein code for programming one or more processors to perform a digital image stabilization method, wherein the method comprises:
  acquiring a sequence of temporally proximate image frames;
  computing an estimated total camera motion between the image frames;
  determining a desired component of the estimated total camera motion including distinguishing an undesired component of the estimated total camera motion, and including characterizing vector values of motion between the image frames, including:

determining at least first and second thresholds adapted to said image frames to generate a sign value range {−1, 0, +1}, including calculating said thresholds as percentages of a dynamic luminance range of the sequence;

incrementing (+1) a counter for each pixel group having a summed luminance that is greater than a first threshold;

decrementing (−1) said counter for each pixel group having a summed luminance that is less than a second threshold, wherein the counter is unchanged (0), neither incremented nor decremented, for each pixel group having a summed luminance between the first and second thresholds;

determining final values of counts for the image frames by summing along rows and columns; and representing the vector values of the desired camera motion based on said final values of counts for the image frames;

generating a corrected image sequence including the desired component of the estimated total camera motion, and excluding the undesired component; and rendering, storing, displaying, transmitting or transferring the corrected image sequence or a further processed version, or combinations thereof.

20. The one or more non-transitory processor-readable storage media of claim 19, wherein one or more of the groups of pixels each comprise one or more rows or columns of pixels.

21. The one or more non-transitory processor-readable storage media of claim 19, wherein one or more of the groups of pixels each comprise a single row or a single column of pixels.

22. The one or more non-transitory processor-readable storage media of claim 19, wherein the undesired component of the estimated total camera motion comprises a jitter component.

23. The one or more non-transitory processor-readable storage media of claim 22, wherein the method further comprises compensating for said jitter component through an image shift/warp function.

24. The one or more non-transitory processor-readable storage media of claim 19, wherein the desired component of the estimated total camera motion comprises a panning component.

25. The one or more non-transitory processor-readable storage media of claim 24, wherein the undesired component of the estimated total camera motion comprises a jitter component.

26. The one or more non-transitory processor-readable storage media of claim 19, wherein the method further comprises generating an integer sign value +1 for a vector element that is above the first threshold.

27. The one or more non-transitory processor-readable storage media of claim 26, wherein the method further comprises generating an integer sign value −1 for a vector element that is below the second threshold.

* * * * *